(12) United States Patent
Kuo et al.

(10) Patent No.: US 12,035,841 B2
(45) Date of Patent: *Jul. 16, 2024

(54) AUTOMATIC COOKING MACHINE HAVING A BLENDER

(71) Applicant: Botrista, Inc., San Mateo, CA (US)

(72) Inventors: Wu-Chou Kuo, Taipei (TW); Hao-Che Hsu, San Mateo, CA (US); Yu-Min Lee, New Taipei (TW)

(73) Assignee: BOTRISTA, INC., Dover, DE (US)

( * ) Notice: Subject to any disclaimer, the term of this patent is extended or adjusted under 35 U.S.C. 154(b) by 378 days.

This patent is subject to a terminal disclaimer.

(21) Appl. No.: 17/506,191

(22) Filed: Oct. 20, 2021

(65) Prior Publication Data

US 2022/0039591 A1 Feb. 10, 2022

Related U.S. Application Data

(62) Division of application No. 16/559,195, filed on Sep. 3, 2019, now Pat. No. 11,191,387.

(Continued)

(51) Int. Cl.
*A47J 36/16* (2006.01)
*A47J 27/00* (2006.01)
(Continued)

(52) U.S. Cl.
CPC .......... *A47J 36/165* (2013.01); *A47J 27/002* (2013.01); *A47J 27/14* (2013.01); *A47J 36/06* (2013.01); *A47J 36/26* (2013.01); *A47J 44/02* (2013.01)

(58) Field of Classification Search
None
See application file for complete search history.

(56) References Cited

U.S. PATENT DOCUMENTS

| 5,230,280 A | 7/1993 | Anderson et al. |
| 9,655,467 B1 | 5/2017 | Martin |

(Continued)

FOREIGN PATENT DOCUMENTS

| CN | 202365622 U | 8/2012 |
| CN | 203263032 U | 11/2013 |

(Continued)

OTHER PUBLICATIONS

Chinese Office Action and Search Report for Chinese Application No. 201910824376.7, dated Dec. 17, 2020, with English translation.

(Continued)

*Primary Examiner* — John J Norton
(74) *Attorney, Agent, or Firm* — Birch, Stewart, Kolasch & Birch, LLP

(57) ABSTRACT

An automatic cooking machine includes: an upper portion provided with a connection port thereon; a control interface arranged to operably generate control commands based on a user's manipulations to control operation of the automatic cooking machine; a base; a heater arranged on the base; a supporting portion coupled between the upper portion and the base, and arranged to support the upper portion; a hopper for receiving materials and having a hollow feeding tube, wherein the feeding tube is detachably inserted into the connection port; a cooking pot capable of being heated on the heater; and a strainer capable of being placed in the cooking pot and receiving materials. The automatic cooking machine further comprises: a blender, comprising: two cantilever arms, multiple blending arms, a ring-shaped flange, and a positioning pillar.

15 Claims, 13 Drawing Sheets

Related U.S. Application Data

(60) Provisional application No. 62/798,073, filed on Jan. 29, 2019, provisional application No. 62/725,668, filed on Aug. 31, 2018.

(51) Int. Cl.
*A47J 27/14* (2006.01)
*A47J 36/06* (2006.01)
*A47J 36/26* (2006.01)
*A47J 44/02* (2006.01)

(56) References Cited

U.S. PATENT DOCUMENTS

| | | |
|---|---|---|
| 10,064,521 B1 | 9/2018 | Gawali et al. |
| 11,191,387 B2 * | 12/2021 | Kuo .................. A47J 27/002 |
| 2014/0007978 A1 | 1/2014 | Cheikh et al. |
| 2016/0235239 A1 | 8/2016 | Patadia |

FOREIGN PATENT DOCUMENTS

| | | |
|---|---|---|
| CN | 207519998 U | 6/2018 |
| TW | M430943 U1 | 6/2012 |
| TW | 201729735 A | 9/2017 |

OTHER PUBLICATIONS

Taiwanese Office Action and Search Report dated Jun. 5, 2020 for Application No. 108131577, with a partial English translation of the Office Action and a English translation of the Search Report.
U.S. Office Action for U.S. Appl. No. 17/506,188, dated Feb. 15, 2024.

\* cited by examiner

AUTOMATIC COOKING MACHINE HAVING A BLENDER

CROSS-REFERENCE TO RELATED APPLICATIONS

This application is a Divisional of co-pending U.S. patent application Ser. No. 16/559,195, filed on Sep. 3, 2019, which claims priority under 35 U.S.C. 119(e) to U.S. Provisional Application No. 62/725,668 filed on Aug. 31, 2018 and U.S. Provisional Application Ser. No. 62/798,073, filed on Jan. 29, 2019. The entire contents of which are hereby incorporated by reference for all purposes.

BACKGROUND

The disclosure generally relates to an automatic cooking machine and, more particularly, to an automatic cooking machine having a blender and capable of controlling the amount of ingredients to be cooked and the timing of cooking.

For many restaurants or beverage stores, the cooking of ingredients is an important part of daily operations as well as one of the main sources that the labor cost derives. Most ingredients require appropriate preparation time to cook. In order to fulfill the orders that come in after the business hours begin, conventional restaurants or beverage stores usually cook some ingredients in advance, especially for those popular restaurants or beverage stores. In this situation, the staffs of the restaurants or beverage stores have to go to work earlier, and they would be quite busy during the preparation period before the business hours. In addition, some ingredients cannot be kept for too long after they are cooked, or are not suitable to be reheated, such as bubbles, noodles, spaghetti, tang yuan, taro balls, sweet potato balls, or the like, and thus the cooked ingredients should be replaced with fresh ingredients every once in a while. As a result, the staffs of the restaurants or beverage stores would be very busy in many periods during a day, and consequently it usually results in big or small problems, such as excessive fatigue, accidents, food waste due to cooking fails, or the like.

Theoretically, a comprehensive personnel training program may mitigate the aforementioned problems. However, as commonly known, the time and cost required for personnel training is considerable, while the turnover rate in the food service industry is very high. Therefore, without the aid of automatic equipment, it is difficult to resolve or mitigate the aforementioned problems derived from the busy work in the food service industry.

SUMMARY

An example embodiment of an automatic cooking machine is disclosed, comprising: an upper portion, having a connection port thereon; a control interface, arranged to operably generate controlling commands according to manipulations of a user to control operations of the automatic cooking machine; a base; a heater, arranged on the base; a supporting portion, coupled between the upper portion and the base, and arranged to support the upper portion; a hopper, arranged to operably receive ingredients, and having a hollow feeding tube, wherein the feeding tube is detachably inserted into the connection port, and a terminal end of the feeding tube has an opening; a cooking pot, arranged to be capable of being heated on the heater; and a strainer, arranged to be capable of being placed in the cooking pot to receive ingredients, wherein the strainer is provided with one or more holders, a bottom and sidewalls of the strainer are provided with multiple filter pores, and when the strainer is placed in the cooking pot, the one or more holders are exposed outside the cooking pot; wherein a holding base is further arranged at a center position of the bottom of the strainer, and the holding base has a notch positioned thereon, while the automatic cooking machine further comprises: a second motor, arranged to operably drive a second rotating shaft to rotate; a driving element, coupled with the second rotating shaft, wherein the driving element comprises: two bended driving arms, respectively arranged at two opposite sides of the driving element, wherein free ends of the two driving arms substantially extend downwards; and a blender, comprising: two cantilever arms, respectively arranged at two opposite sides of a top portion of the blender; multiple blending arms, respectively extending outwards from a main body of the blender; a ring-shaped flange, positioned near a bottom portion of the blender and extending outwards from the blender; and a positioning pillar, positioned beneath the ring-shaped flange, and arranged to be operably inserted into the notch on the holding base; wherein when the second motor drives the second rotating shaft to rotate the driving element, the two driving arms respectively touch and push the two cantilever arms of the blender to drive the blender to rotate clockwise or counterclockwise.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
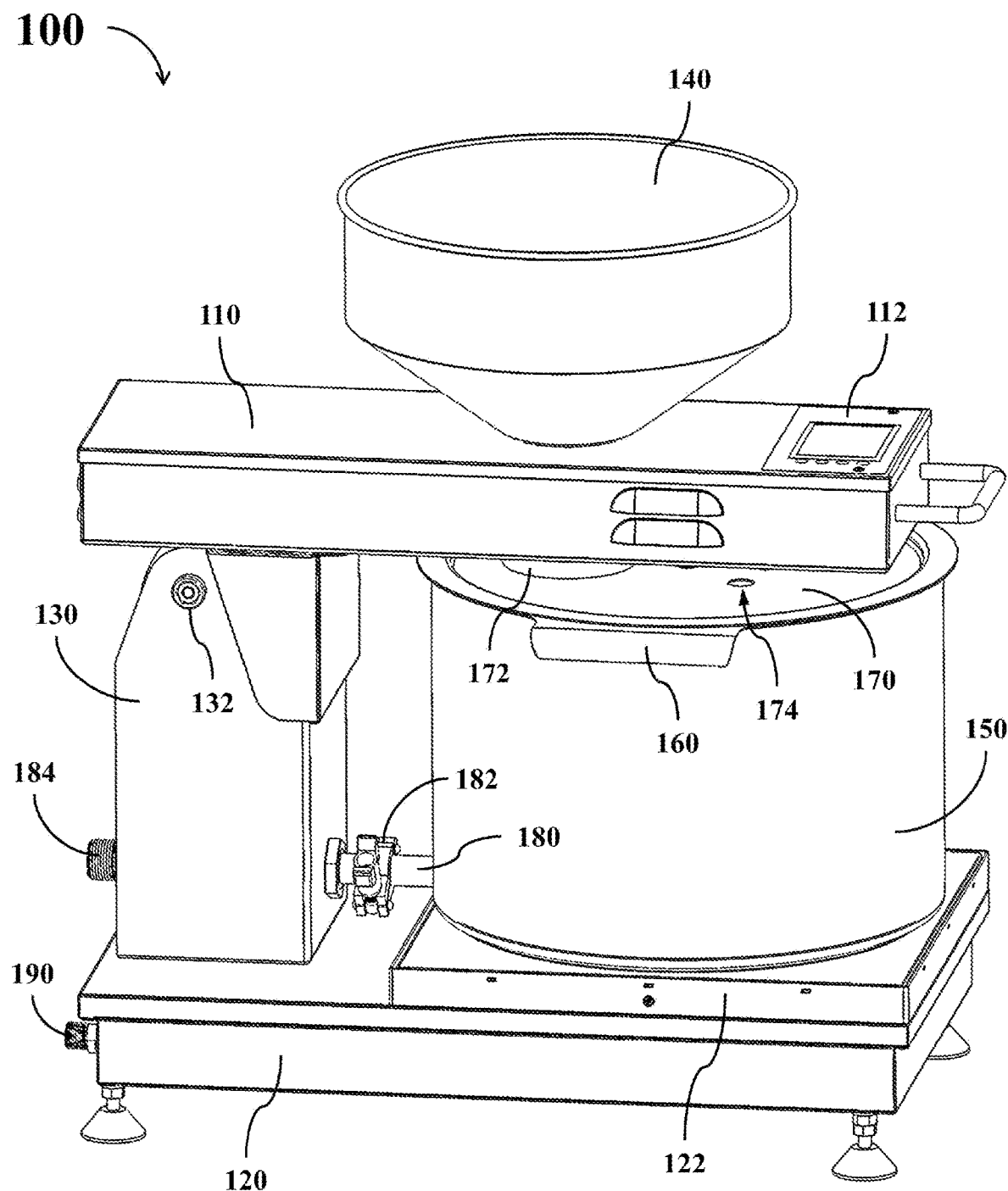
FIG. 1 and FIG. 2 show simplified schematic diagrams of an automatic cooking machine from different viewing angles according to one embodiment of the present disclosure.
Figure 2:
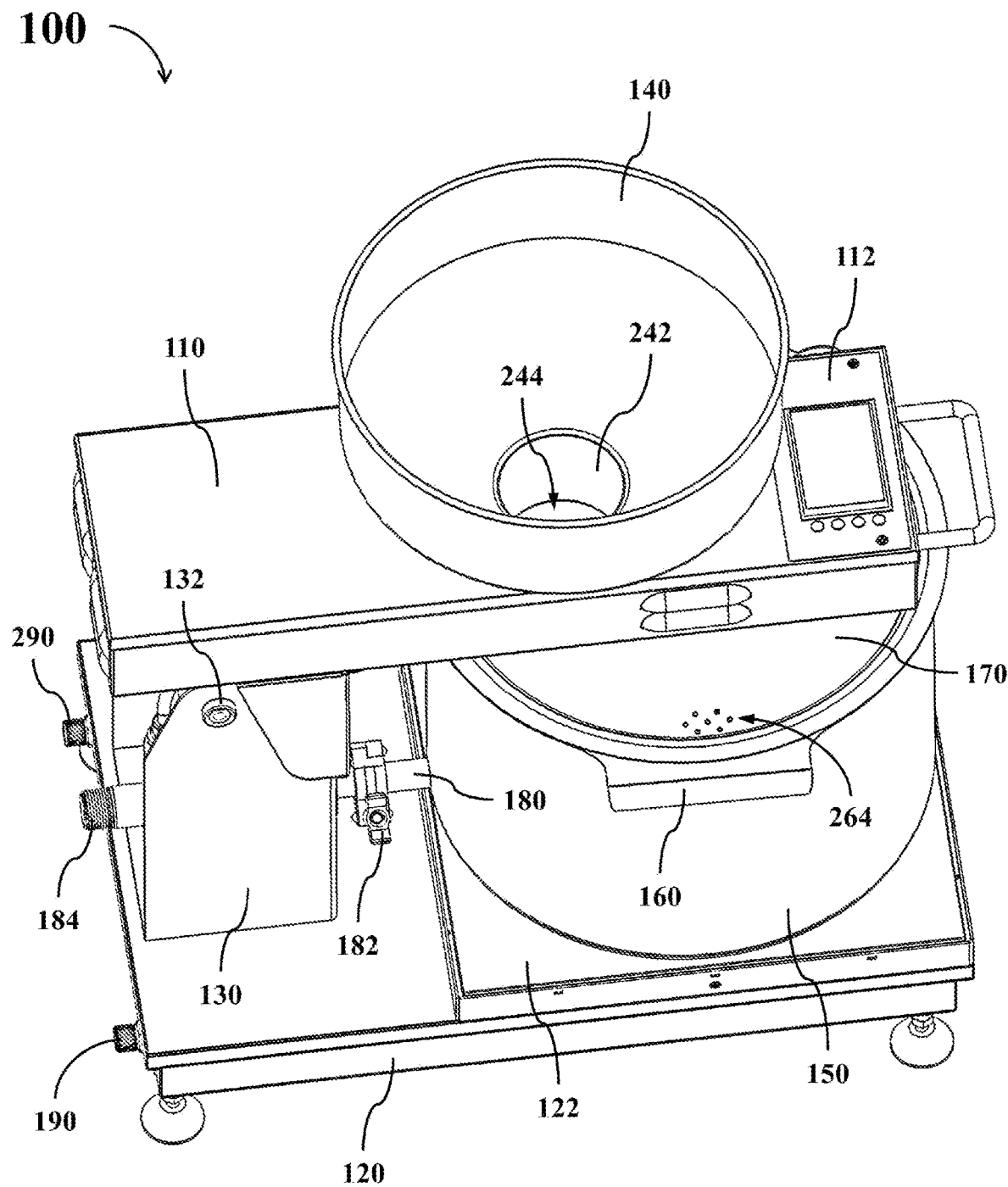
Figure 3:
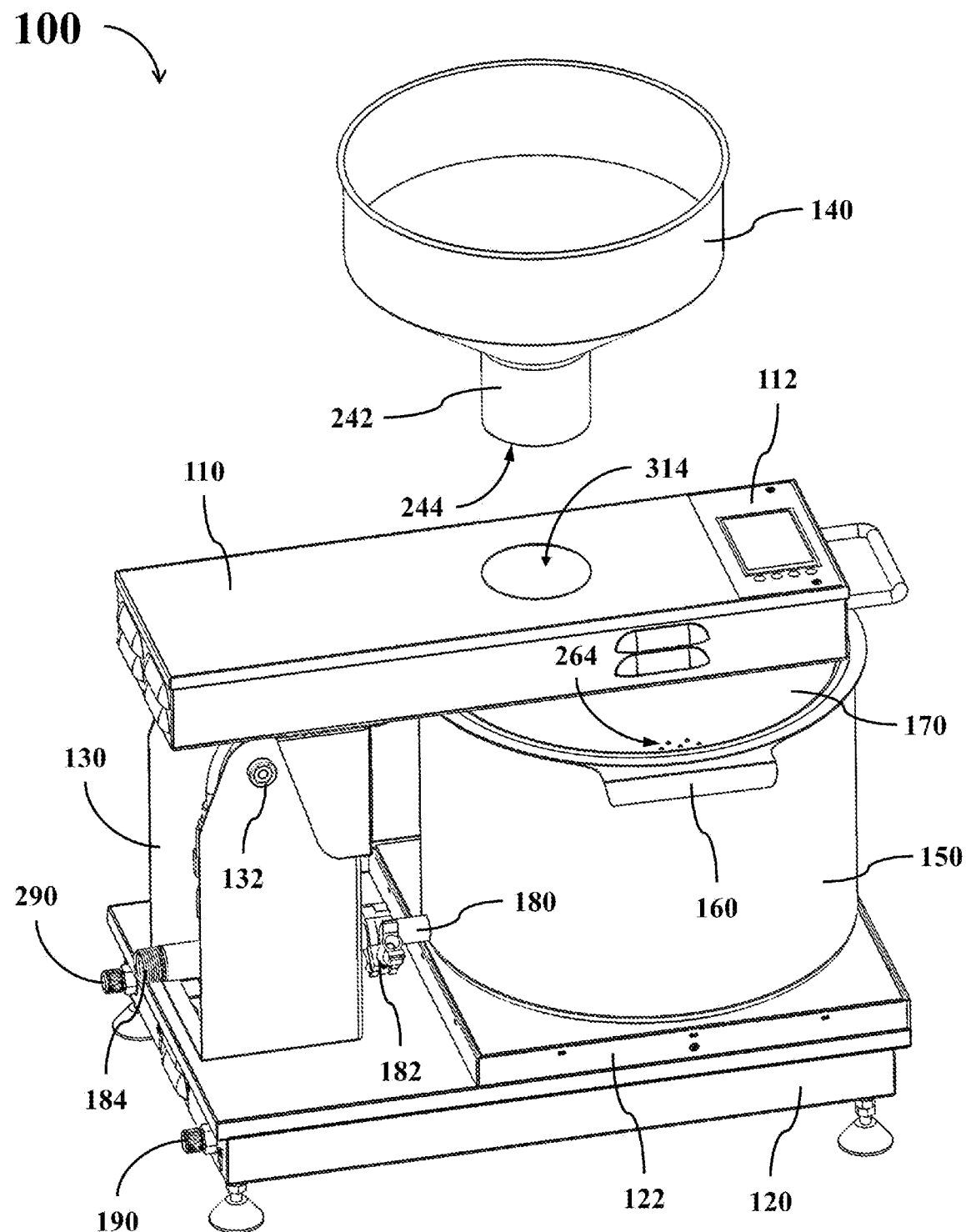
FIG. 3 shows a schematic diagram of the automatic cooking machine when a hopper thereof is separated according to one embodiment of the present disclosure.

Please refer to FIG. 1 through FIG. 3. FIG. 1 and FIG. 2 show simplified schematic diagrams of an automatic cooking machine 100 from different viewing angles according to one embodiment of the present disclosure. FIG. 3 shows a schematic diagram of the automatic cooking machine 100 when a hopper 140 thereof is separated according to one embodiment of the present disclosure. The automatic cooking machine 100 is capable for providing the function of automatically controlling the cooking process of the ingredients.

As shown in FIG. 1 through FIG. 3, the automatic cooking machine 100 comprises an upper portion 110, a base 120, a supporting portion 130, a pivot 132, a heater 122, the hopper 140, a cooking pot 150, a strainer 160, a pot lid 170, a drain pipe 180, a drain port 184, and water inlet ports 190 and 290.

The upper portion 110 is provided with a control interface 112 and a connection port 314. The control interface 112 is coupled with the controlling circuit (not shown in the drawings) of the automatic cooking machine 100, and arranged to operably generate controlling commands according to manipulations of a user to control operations of the automatic cooking machine 100. In practice, the control interface 112 may be realized with a touch panel or a keyboard, or may be realized with a combination of a display device and multiple buttons. The aforementioned controlling circuit may be arranged within the upper portion 110 or the supporting portion 130, while the controlling circuit may be realized with one or more processor modules cooperating with appropriate storage circuits or memories. In this embodiment, the connection port 314 penetrates the upper portion 110.

An inner portion of the upper portion 110 may be utilized for installing partial circuit components, power lines, signal lines, heat dissipation structures, and/or water pipes, or other components of the automatic cooking machine 100.

The base 120 is utilized for maintaining the body of the automatic cooking machine 100 to stand stably. Support legs, washers, lumps, or turning wheels of appropriate quantity may be arranged beneath the base 120. An inner portion of the base 120 may be utilized for installing partial water inlet structures and/or heat dissipation structures of the automatic cooking machine 100.

The heater 122 is arranged on the base 120 and may be arranged to operably heat up the cooking pot 150 positioned on the heater 122 through various appropriate heating mechanisms. For example, the heater 122 may be realized in the form of a gas stove or an induction stove.

The supporting portion 130 is coupled between the upper portion 110 and the base 120, and is arranged to operably support the upper portion 110. The inner portion of the supporting portion 130 may be utilized for installing partial circuit components, power lines, signal lines, and/or water pipes, or other components of the automatic cooking machine 100. In addition, some electronic components of the automatic cooking machine 100, such as switches, power plugs, and/or signal connectors, may be arranged on surfaces of the supporting portion 130.

The pivot 132 is arranged on the supporting portion 130 and is connected with the upper portion 110 through appropriate structures or components, so that the upper portion 110 is pivoted with the supporting portion 130 through the pivot 132.

The hopper 140 is designed to have a storage space for containing ingredients, and has a hollow feeding tube 242. A terminal end of the feeding tube 242 has an opening 244, and the shape of the feeding tube 242 may be dimensioned to correspond to the shape of the connection port 314 of the upper portion 110. As shown in FIG. 3, the feeding tube 242 may be detachably inserted into the connection port 314 of the upper portion 110. In practice, an upper end of the hopper 140 may be designed as an opening, or may be provided with an additional cover to prevent dust, insects, or other foreign objects from entering the hopper 140.

The cooking pot 150 is arranged to be capable of containing liquids, such as water or soup, and can be heated on the heater 122. The cooking pot 150 may be made with materials suitable to be heated on the heater 112. For example, the cooking pot 150 may be realized with an iron pot, a stainless steel pot, an aluminum alloy pot, a titanium alloy pot, a ceramic pot, or the like. In addition, the cooking pot 150 has no particular limitation on its shape. Therefore, the shape of the cooking pot 150 may be modified according to the requirement of the practical applications, and not restricted to the scheme shown in the drawings.

The strainer 160 is arranged to be capable of being placed in the cooking pot 150 to receive and contain ingredients, and the strainer 160 is capable of being placed in the cooking pot 150. The strainer 160 may be made with materials suitable for being heated in the water. For example, the strainer 160 may be realized with an iron pot, a stainless-steel pot, an aluminum alloy pot, a titanium alloy pot, a ceramic pot, a heat-resistant plastic pot, or the like.

The pot lid 170 comprises a material inlet port 172, a water delivery hole 174, and one or more steam outlets 264. When the pot lid 170 covers the cooking pot 150, the inlet port 172 is aligned with the opening 244 of the feeding tube 242.

The drain pipe 180 is coupled with sidewalls of the cooking pot 150, and arranged to operably drain the liquid from the cooking pot 150. In this embodiment, a terminal of the drain pipe 180 is coupled with the cooking pot 150, while the other terminal of the drain pipe 180 is coupled with the supporting portion 130. In practice, the drain pipe 180 may be realized with a single water pipe, or may be a combination of two connected water pipes. For example, as shown in FIG. 1 through FIG. 3, an engagement element 182 may be utilized to connect two water pipes, which are respectively connected to the cooking pot 150 and the supporting portion 130, to each other to form the drain pipe 180.

The drain port 184 is coupled with the drain pipe 180, and arranged to be operably connected with appropriate drain pipelines so as to drain outwards the liquid transmitted from the drain pipe 180. The water inlet port 190 is arranged to be operably connected with appropriate cold-water pipeline so as to input cold water, while the water inlet port 290 is arranged to be operably connected with appropriate hot-water pipeline so as to input hot water. In this embodiment, the drain port 184 is arranged at a rear side of the supporting portion 130, while the water inlet ports 190 and 290 are arranged at a rear side of the base 120.

When using the automatic cooking machine 100, the user may lift one end of the upper portion 110 upwards (e.g., the end near the control interface 112 as shown in the drawings)

so as to take out the strainer 160 or objects in the strainer 160, or to put required ingredients into the strainer 160.

Please note that the position of the aforementioned control interface 112 is not restricted to the pattern shown in the drawings. In some embodiments, the control interface 112 may be instead arranged at other positions on an upper surface of the upper portion 110, appropriate positions on lateral sides of the upper portion 110, or even on the surfaces of the supporting portion 130.

The aforementioned heater 122 is arranged on the upper surface of the base 120, but this is merely an exemplary embodiment, rather than a restriction to the practical implementations. For example, the heater 122 may instead be embedded into the base 120, so that the top surface of the heater 122 is on the same level of or lower than the upper surface of the base 120. In addition, temperature measuring devices (not shown in the drawings) may be arranged at appropriate positions of the automatic cooking machine 100, so that the controlling circuit of the automatic cooking machine 100 can control the temperature when cooking the ingredients, and adjust the operations of the heater 122 accordingly.

The aforementioned drain pipe 180 is coupled between the cooking pot 150 and the supporting portion 130, but this is merely an exemplary embodiment, rather than a restriction to the practical implementations. For example, the drain pipe 180 may instead be coupled between the cooking pot 150 and the base 120.

The position of the aforementioned drain port 184 is not restricted to the pattern shown in the drawings. In some embodiments, the drain port 184 may instead be arranged on other lateral side of the supporting portion 130, or on one of the lateral sides of the base 120.

The positions of the aforementioned water inlet ports 190 and 290 are not restricted to the pattern shown in the drawings. In some embodiments, the water inlet ports 190 and 290 may instead be arranged on other lateral side of the supporting portion 130, on a same lateral side of the base 120, or two different lateral sides of the base 120.

In operations, the automatic cooking machine 100 may automatically control the timing for cooking the ingredients and the amount of ingredients to be cooked according to the parameters configured by the user through the control interface 112.

Figure 4:
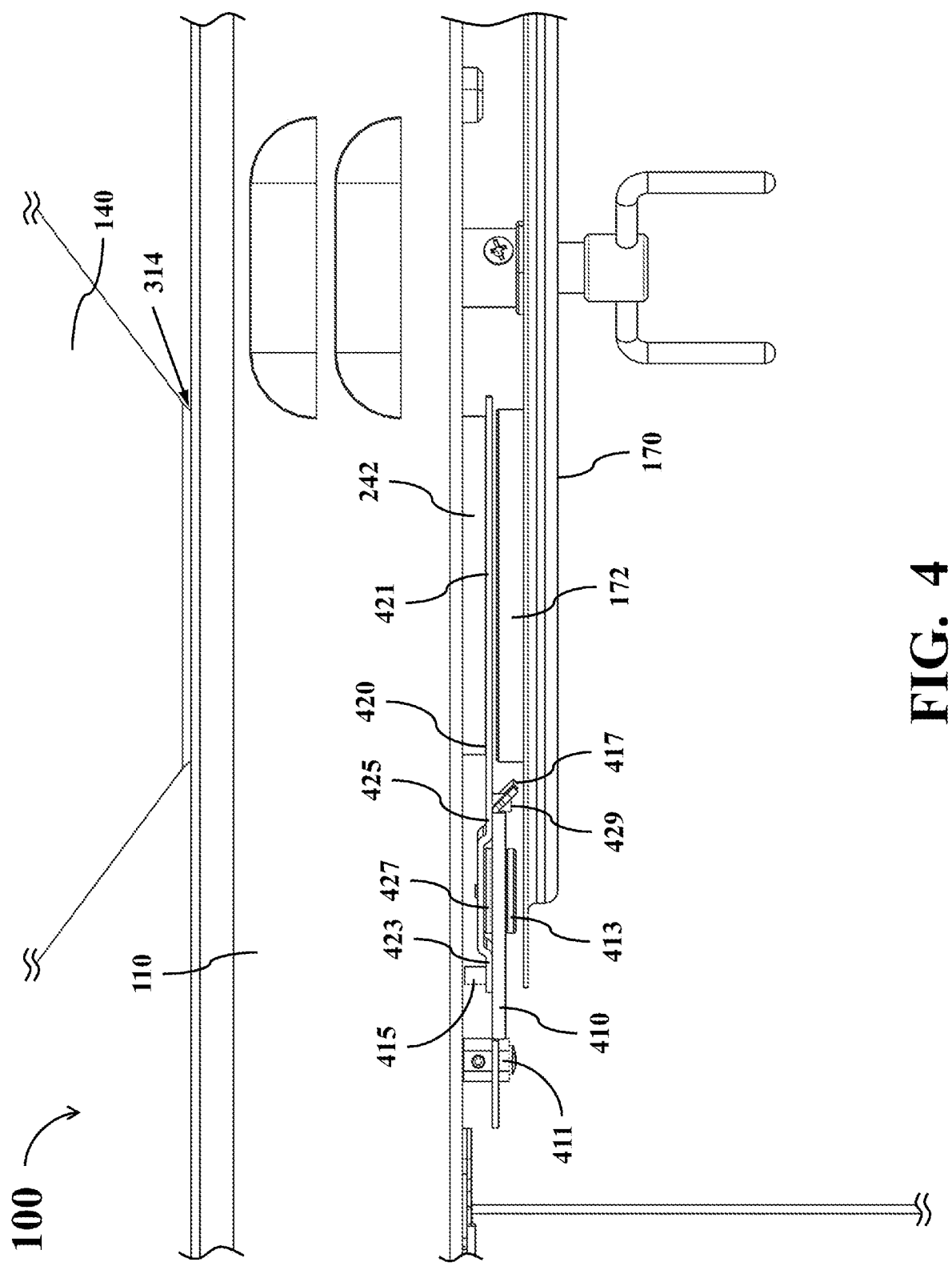
FIG. 4 shows a simplified side view of partial components of the automatic cooking machine according to one embodiment of the present disclosure.
Figure 5:
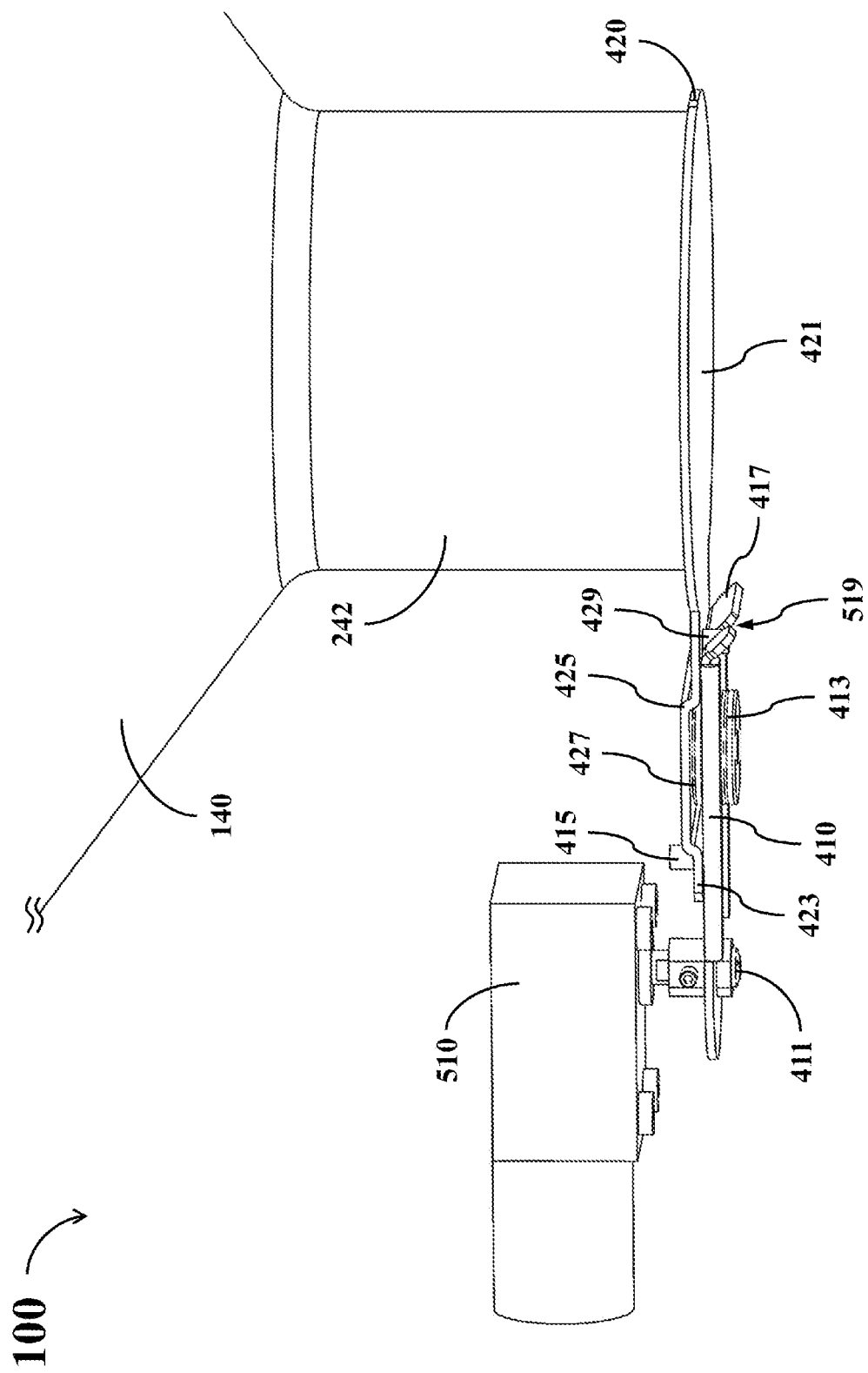
FIG. 5 shows a simplified schematic diagram of a spatial relationship among partial components of the automatic cooking machine according to one embodiment of the present disclosure.
Figure 6:
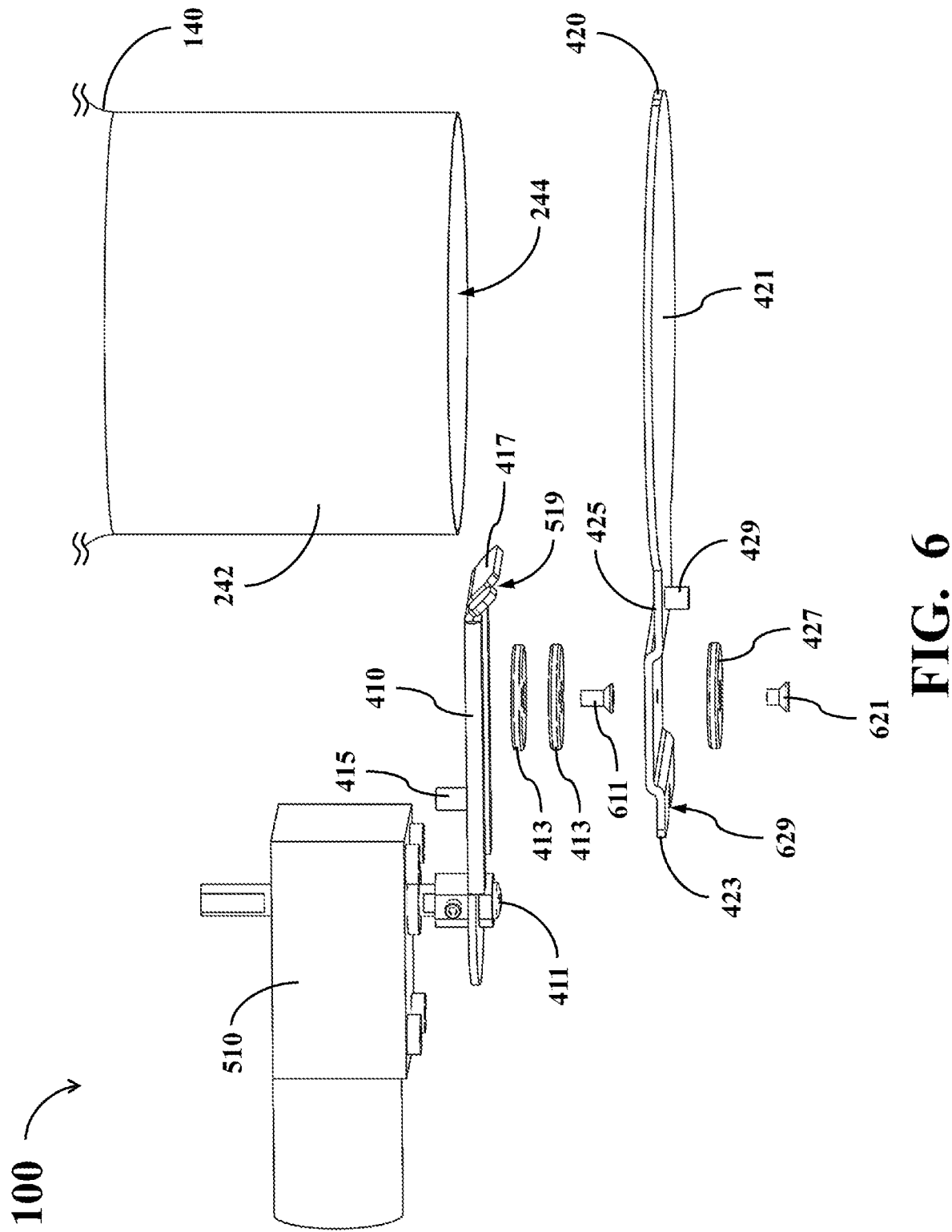
FIG. 6 and FIG. 7 show simplified decomposed schematic diagrams of partial components of the automatic cooking machine according to one embodiment of the present disclosure.
Figure 7:
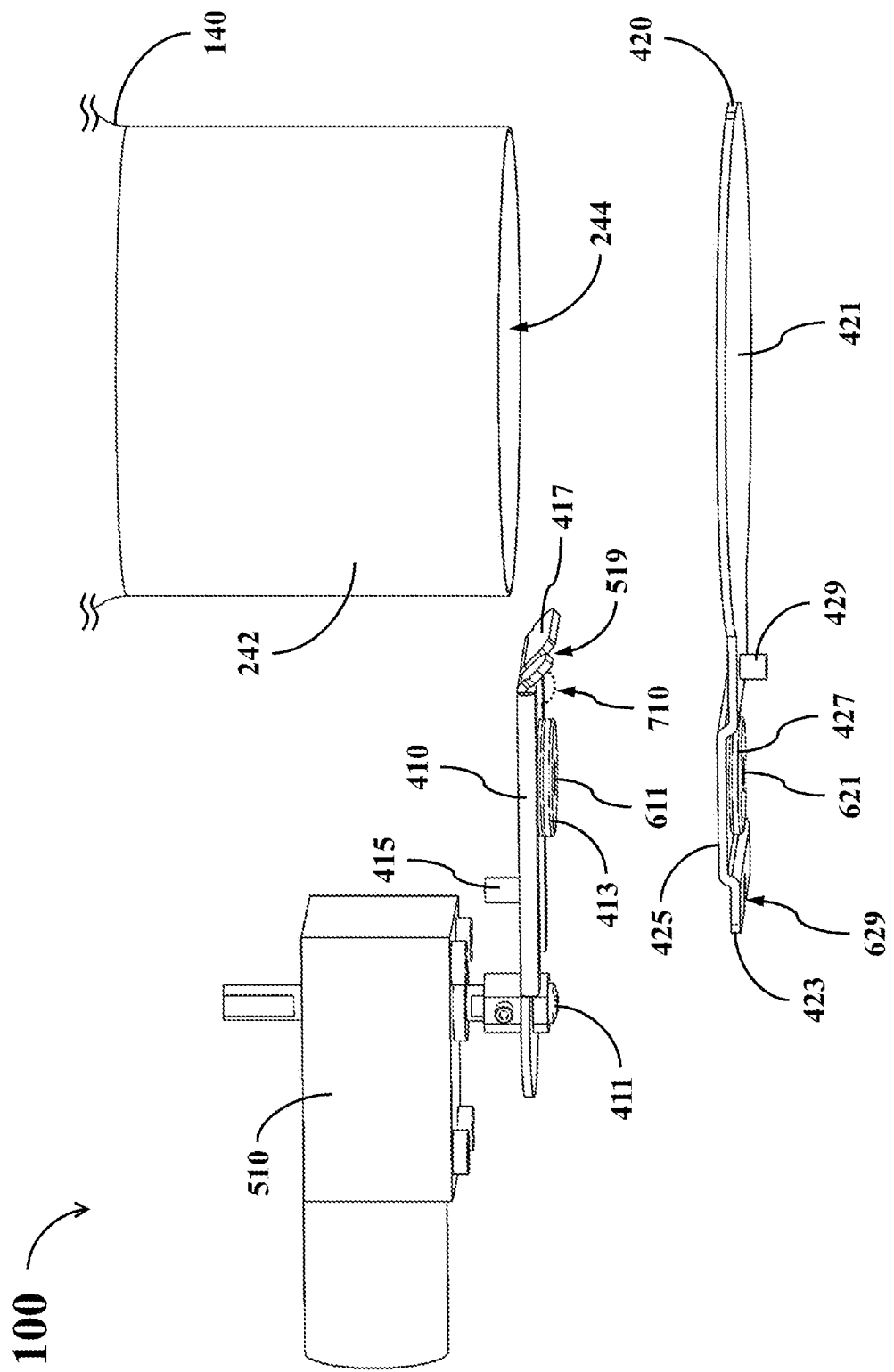

Relevant structures of the automatic cooking machine 100 for controlling the amount of ingredients to be cooked and the timing of cooking will be further described below by reference to FIG. 4 through FIG. 7. FIG. 4 shows a simplified side view of partial components of the automatic cooking machine 100 according to one embodiment of the present disclosure. FIG. 5 shows a simplified schematic diagram of a spatial relationship among partial components of the automatic cooking machine 100 according to one embodiment of the present disclosure. FIG. 6 and FIG. 7 show simplified decomposed schematic diagrams of partial components of the automatic cooking machine 100 according to one embodiment of the present disclosure.

As shown in FIG. 4 through FIG. 7, the automatic cooking machine 100 further comprises a moving arm 410, a blocking element 420, and a first motor 510.

The first motor 510 is arranged to operably drive the first rotating shaft 411 to rotate. In practice, the first motor 510 may be arranged within the upper portion 110, and may be realized with various appropriate motors, such as a DC motor, a stepper motor, a brushless DC motor, a servo motor, or the like.

The moving arm 410 is coupled with the first rotating shaft 411, and arranged to operably drive the blocking element 420 to rotate. As shown in FIG. 4 through FIG. 7, the moving arm 410 has a main body which is substantially in a shape of flat plane, and the moving arm 410 comprises a first magnetic element 413, a first limiting element 415, a free end 417, and a first notch 519 positioned on the free end 417.

In the moving arm 410, the first magnetic element 413 is arranged on one of the surfaces of the moving arm 410, and the quantity of the first magnetic element 413 may be one or more than one. The first limiting element 415 extends outwards from one of the surfaces of the moving arm 410.

As shown in FIG. 4 through FIG. 7, the blocking element 420 comprises a blocking plate 421, a tail portion 423, a connecting portion 425, a second magnetic element 427, a second limiting element 429, and a second notch 629 positioned on the tail portion 423.

In the blocking element 420, the blocking plate 421 is in a shape of flat panel, and is arranged to operably block the opening 244 of the feeding tube 242. In this embodiment, the shape of the blocking plate 421 is similar to the shape of the opening 244, while the area of the blocking plate 421 is greater than or equal to the area of the opening 244.

The connecting portion 425 is positioned between the blocking plate 421 and the tail portion 423. The second magnetic element 427 is arranged on one of the surfaces of the connecting portion 425, and the quantity of the second magnetic element 427 may be one or more than one. The second limiting element 429 extends outwards from one of the surfaces of the connecting portion 425.

As shown in FIG. 6, a fastening element 611 may be utilized to fix two first magnetic elements 413 on the moving arm 410, while a fastening element 621 may be utilized to fix the second magnetic element 427 on the connecting portion 425 of the blocking element 420.

In practice, the aforementioned two first magnetic elements 413 may be fixed on the moving arm 410 instead by utilizing appropriate adhesive or welding approaches. Similarly, the aforementioned second magnetic element 427 may be fixed on the connecting portion 425 of the blocking element 420 instead by utilizing appropriate adhesive or welding approaches.

In the embodiments of FIG. 4 through FIG. 7, the first magnetic element 413 is arranged on the bottom surface of the moving arm 410, the first limiting element 415 is arranged on the upper surface of the moving arm 410, and both the second magnetic element 427 and the second limiting element 429 are arranged on the bottom surface of the blocking element 420. The first limiting element 415 of the moving arm 410 is utilized to block the second notch 629 positioned on the tail portion 423 of the blocking element 420, while the second limiting element 429 of the blocking element 420 is utilized to block the first notch 519 positioned on the free end 417 of the moving arm 410.

The aforementioned first magnetic element 413 and the second magnetic element 427 may be realized with magnets having sufficient attraction force, such as AlNiCo magnets, samarium cobalt magnets, neodymium iron boron magnets, or the like. When the user moves the blocking element 420 to an area above the moving arm 410 and near the moving arm 410, the first magnetic element 413 and the second magnetic element 427 would be attracted to each other, causing the blocking element 420 to detachably attach on the moving arm 410.

As shown in FIG. 7, the free end 417 of the moving arm 410 slightly bends downwards, so that an included angle 710 between 120-165 degrees is formed between the free end 417 and the main body of the moving arm 410. Such design enables the free end 417 of the moving arm 410 to be utilized as a guiding portion for guiding the user to connect the blocking element 420 with the moving arm 410, which is beneficial in enhancing the convenience for the user to place the blocking element 420 at an accurate position on the moving arm 410.

After the user moves the blocking element 420 from the free end 417 of the moving arm 410 towards the direction of the first limiting element 415 for a certain distance, the second notch 629 of the blocking element 420 would engage with the first limiting element 415 of the moving arm 410, while the first notch 519 of the moving arm 410 would engage with the second limiting element 429 of the blocking element 420, so that the blocking element 420 cannot move further. In this situation, the connection procedure of the blocking element 420 and the moving arm 410 is complete.

The aforementioned cooperation between the second notch 629 and the first limiting element 415 and the cooperation between the first notch 519 and the second limiting element 429 are also beneficial in improving the stability of the connection between the blocking element 420 and the moving arm 410, thereby reducing the probability that the blocking element 420 shakes or deviates from the correct position.

As shown in FIG. 4, when the pot lid 170 covers the cooking pot 150, the material inlet port 172 of the pot lid 170 is aligned with the opening 244 of the feeding tube 242. As shown in FIG. 5, before reaching a predetermined time point for cooking the ingredients, the first motor 510 controls the first rotating shaft 411 to maintain the moving arm 410 at a predetermined initial position, so that the blocking plate 421 of the blocking element 420 can fully block the opening 244 of the feeding tube 242. In this situation, the blocking plate 421 of the blocking element 420 would bear the weight of the ingredients, but the attraction force between the first magnetic element 413 and the second magnetic element 427 could render the blocking element 420 to firmly attach on the moving arm 410, so that the blocking element 420 would not easily detached from the moving arm 410. Therefore, when the blocking plate 421 of the blocking element 420 blocks the opening 244 of the feeding tube 242, the ingredients in the hopper 140 would not be able to enter the strainer 160 in the cooking pot 150 through the material inlet port 172 of the pot lid 170.

When reaching the predetermined time point for cooking the ingredients configured by the control interface 112, the controlling circuit of the automatic cooking machine 100 would control the first motor 510 to drive the first rotating shaft 411 to horizontally rotate the moving arm 410 towards a predetermined direction (e.g., a clockwise direction) for a predetermined angle, so that a partial area of or an entire area of the opening 244 of feeding tube 242 would not be blocked by the blocking plate 421 of the blocking element 420. In this situation, a specific amount of ingredients would drop from the hopper 140 into the strainer 160 in the cooking pot 150 through the opening 244.

Then, after a predetermined time, the controlling circuit of the automatic cooking machine 100 would control the first motor 510 to drive the first rotating shaft 411 to horizontally rotate the moving arm 410 towards an opposite direction (e.g., a counterclockwise direction) for the predetermined angle, so that the blocking plate 421 of the blocking element 420 again completely blocks the opening 244 of the feeding tube 242. In this way, the rest of the ingredients in the hopper 140 cannot enter the strainer 160.

As can be appreciated from the aforementioned descriptions, by adjusting the aforementioned predetermined angle and the length of the predetermined time, the controlling circuit of the automatic cooking machine 100 is enabled to precisely adjust the amount of ingredients entering the strainer 160.

In addition, the aforementioned mechanism that the automatic cooking machine 100 controls the blocking element 420 may further achieve a timer function for scheduling the time to cook. That is, the user may store the ingredients in the hopper 140 in advance, and utilizes the control interface 112 to configure the time point for cooking. When reaching the time point for cooking, the automatic cooking machine 100 would automatically import a predetermined amount of ingredients into the strainer 160 in the cooking pot 150, and begin to conduct a predetermined cooking procedure.

For example, the user may store specific ingredients (e.g., bobas or tapioca balls) in the hopper 140 before he/she finished the work in the previous day, and utilize the control interface 112 to configure the scheduled time point to cook to be an appropriate time point before the business hours begin next day (e.g., half an hour or an hour before the business hours begin). As a result, before the business hour next day, the automatic cooking machine 100 can automatically complete the cooking procedure of relevant ingredients, without the need to spend human labor to cook relevant ingredients in advance.

Please note that the aforementioned structure of the moving arm 410 and the blocking element 420 is merely an exemplary embodiment, rather than a restriction to the practical implementations. For example, in some embodiments where the connecting portion 425 of the blocking element 420 has a flat-panel shape, the aforementioned second magnetic element 427 may instead be arranged on the upper surface of the blocking element 420.

For another example, in some embodiments where the main body of the moving arm 410 has a notch of appropriate size, the aforementioned first magnetic element 413 may instead be arranged on the upper surface of the moving arm 410.

For another example, the length of the aforementioned moving arm 410 may be extended, so that the position of the free end 417 would be closer to a central portion of the blocking plate 421, thereby increasing the touching area between the blocking element 420 and the moving arm 410 to further improve the stability of the connection between the blocking element 420 and the moving arm 410. In this situation, the second limiting element 429 of the blocking element 420 may be moved to closer to a central portion on the bottom surface of the blocking plate 421, rendering the second limiting element 429 to extend outwards from the bottom surface of the blocking plate 421.

Figure 8:
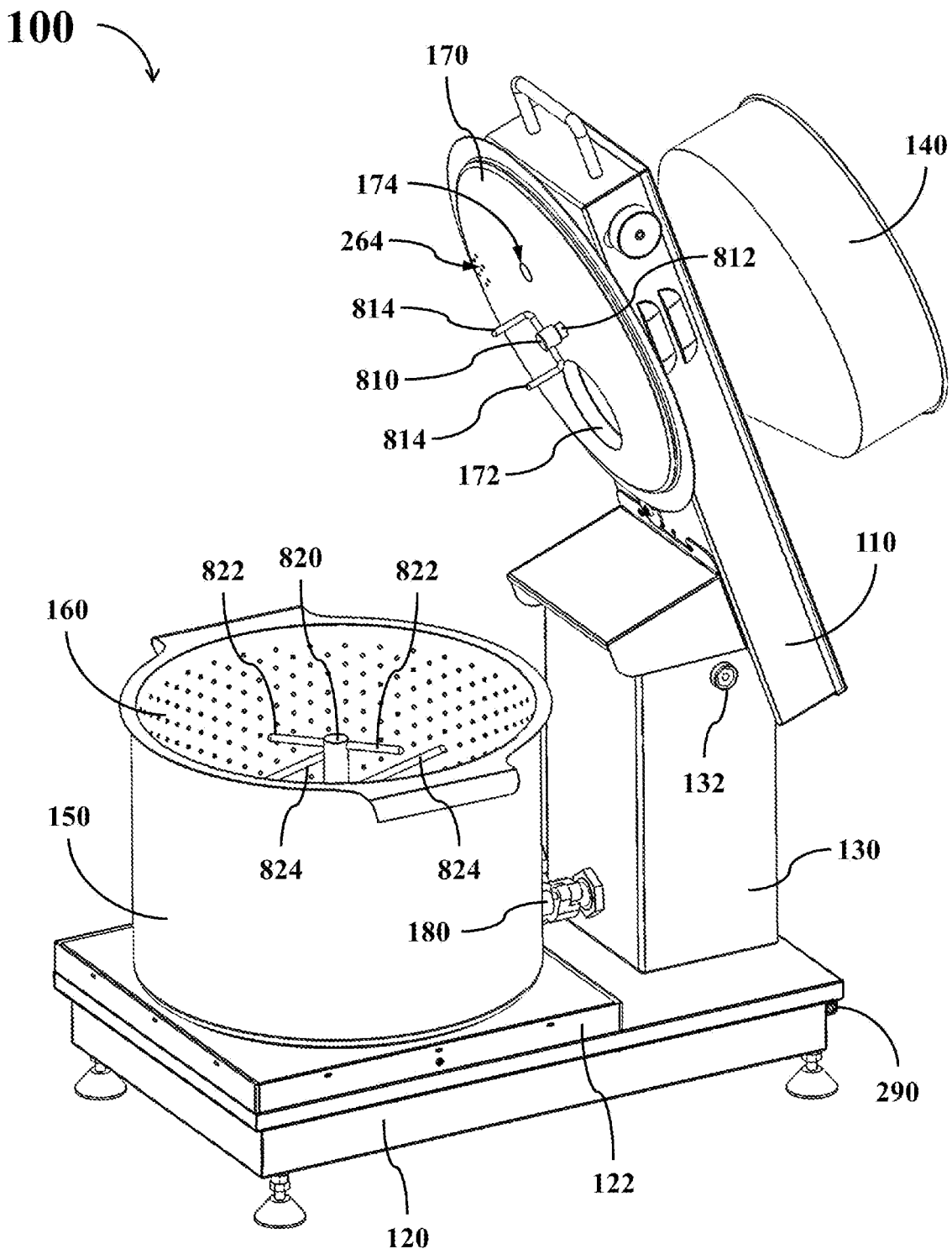
FIG. 8 shows a simplified schematic diagram of the automatic cooking machine when an upper portion thereof is lifted upwards according to one embodiment of the present disclosure.
Figure 9:
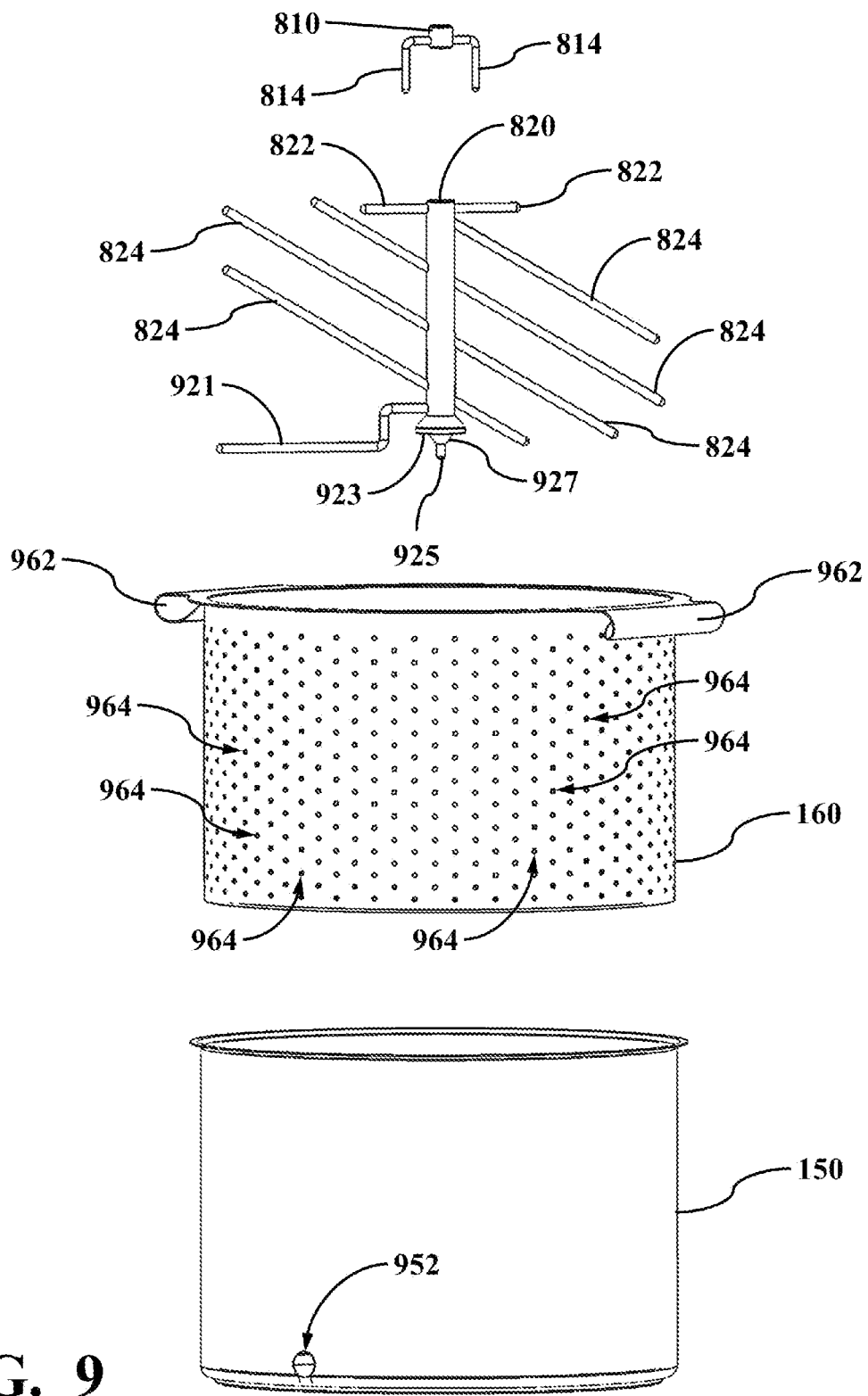
FIG. 9 and FIG. 10 show simplified decomposed schematic diagrams of a cooking pot, a strainer, a driving element, and a blender of the automatic cooking machine from different viewing angles according to one embodiment of the present disclosure.
Figure 10:
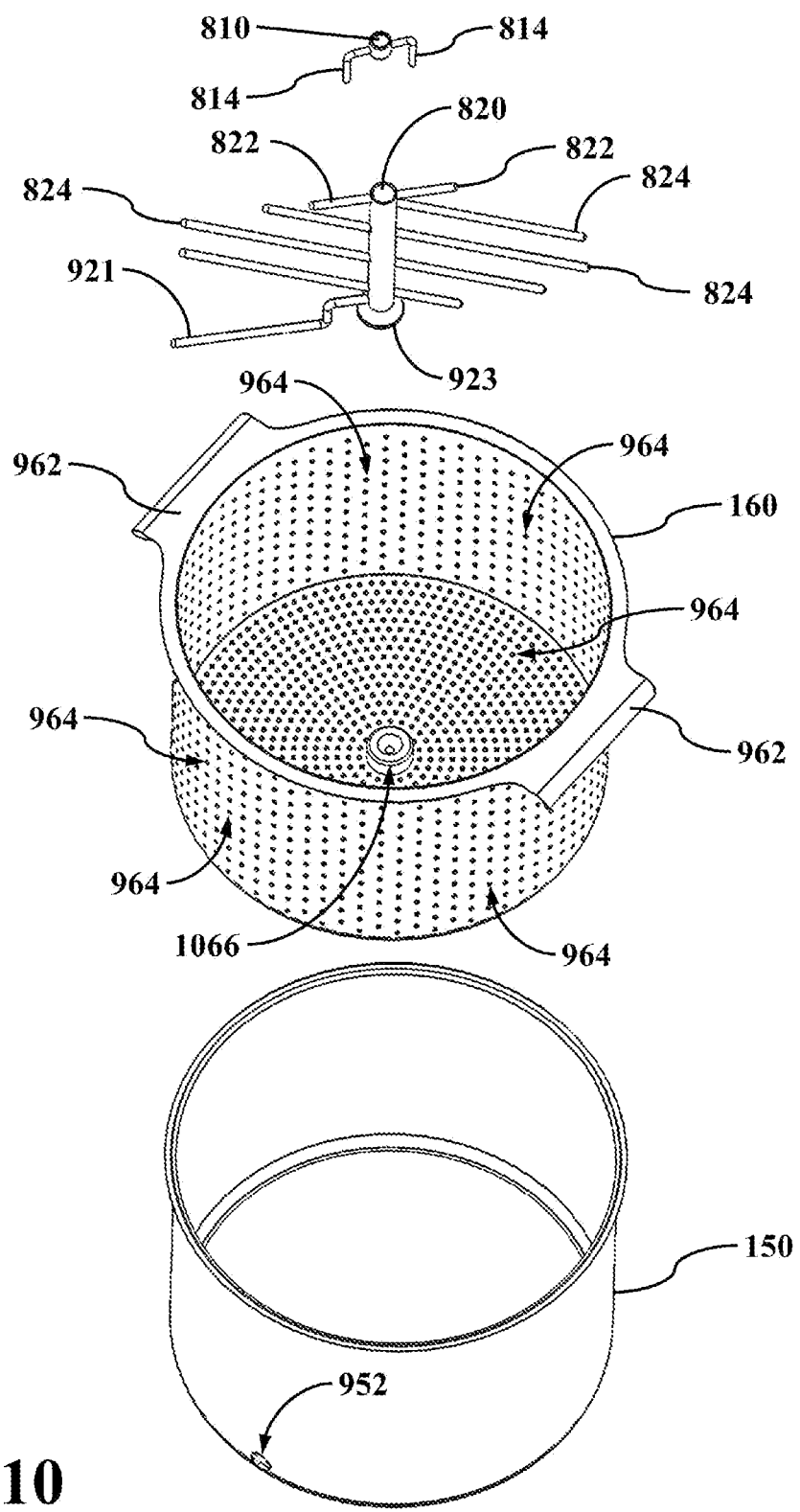
Figure 11:
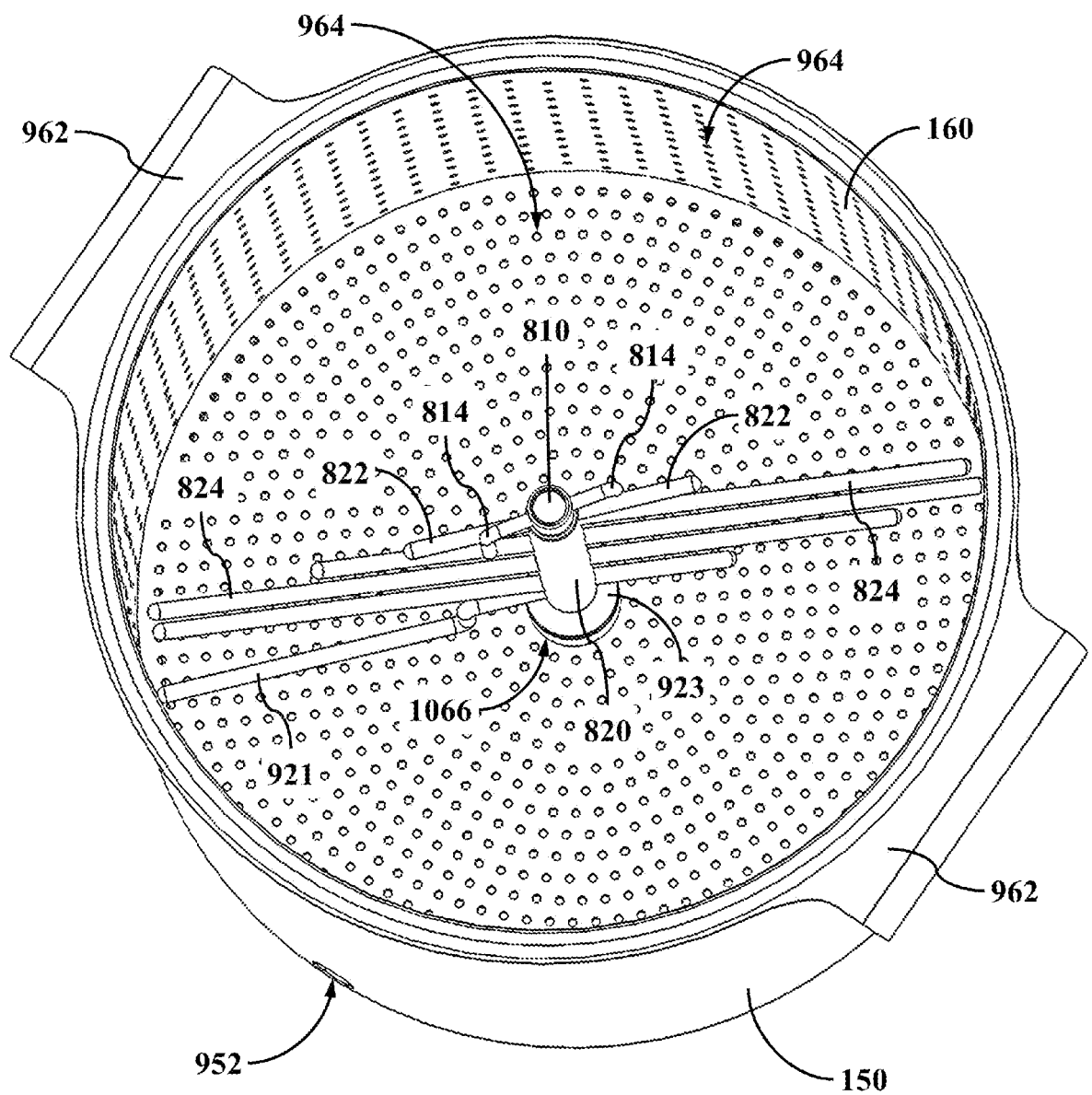
FIG. 11 shows a schematic diagram of the cooking pot, the strainer, the driving element, and the blender in FIG. 9 and FIG. 10 when they are assembled.
Figure 12:
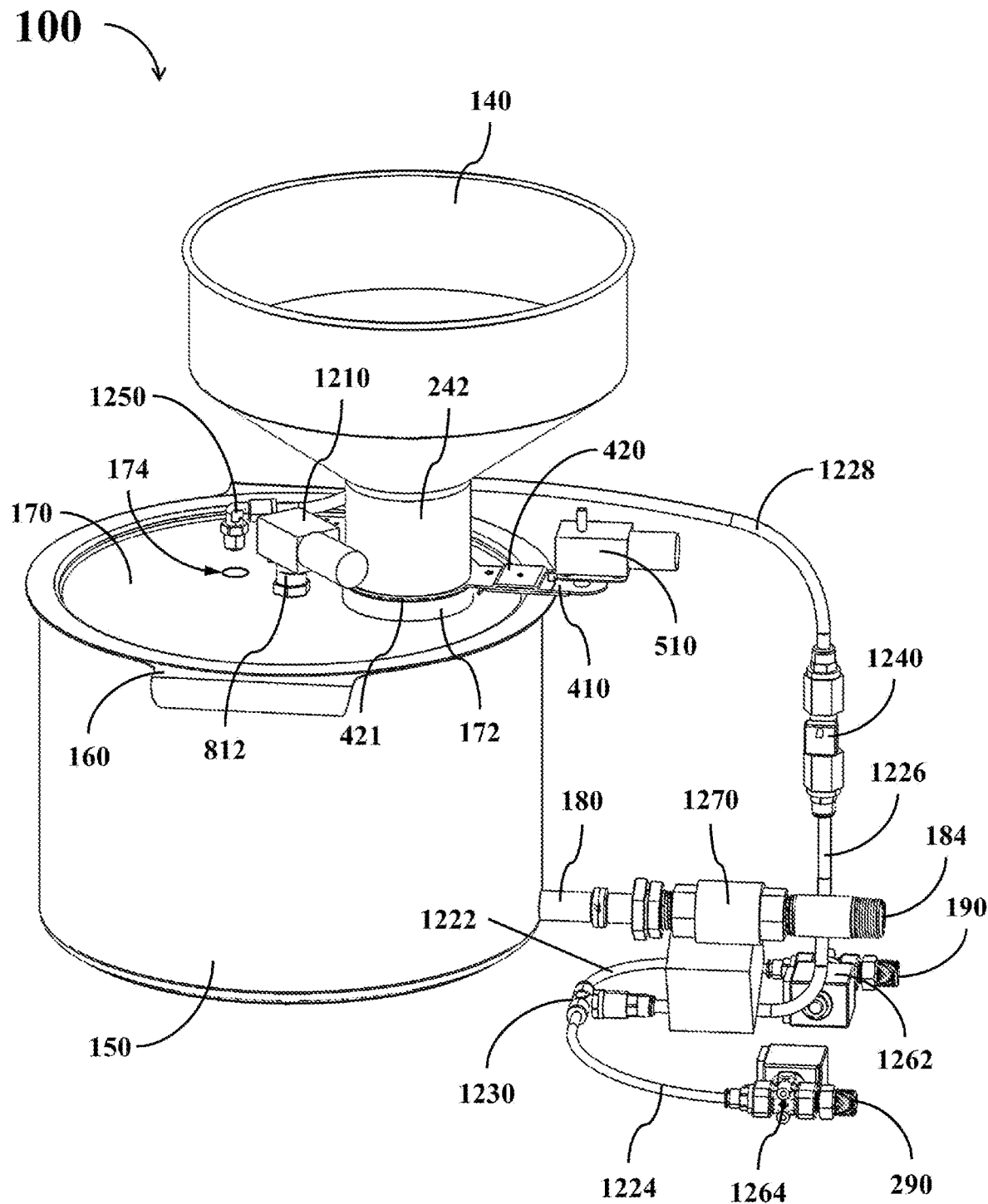
FIG. 12 and FIG. 13 show simplified connection relationship diagrams of partial components of the automatic cooking machine from different viewing angles according to one embodiment of the present disclosure.
Figure 13:
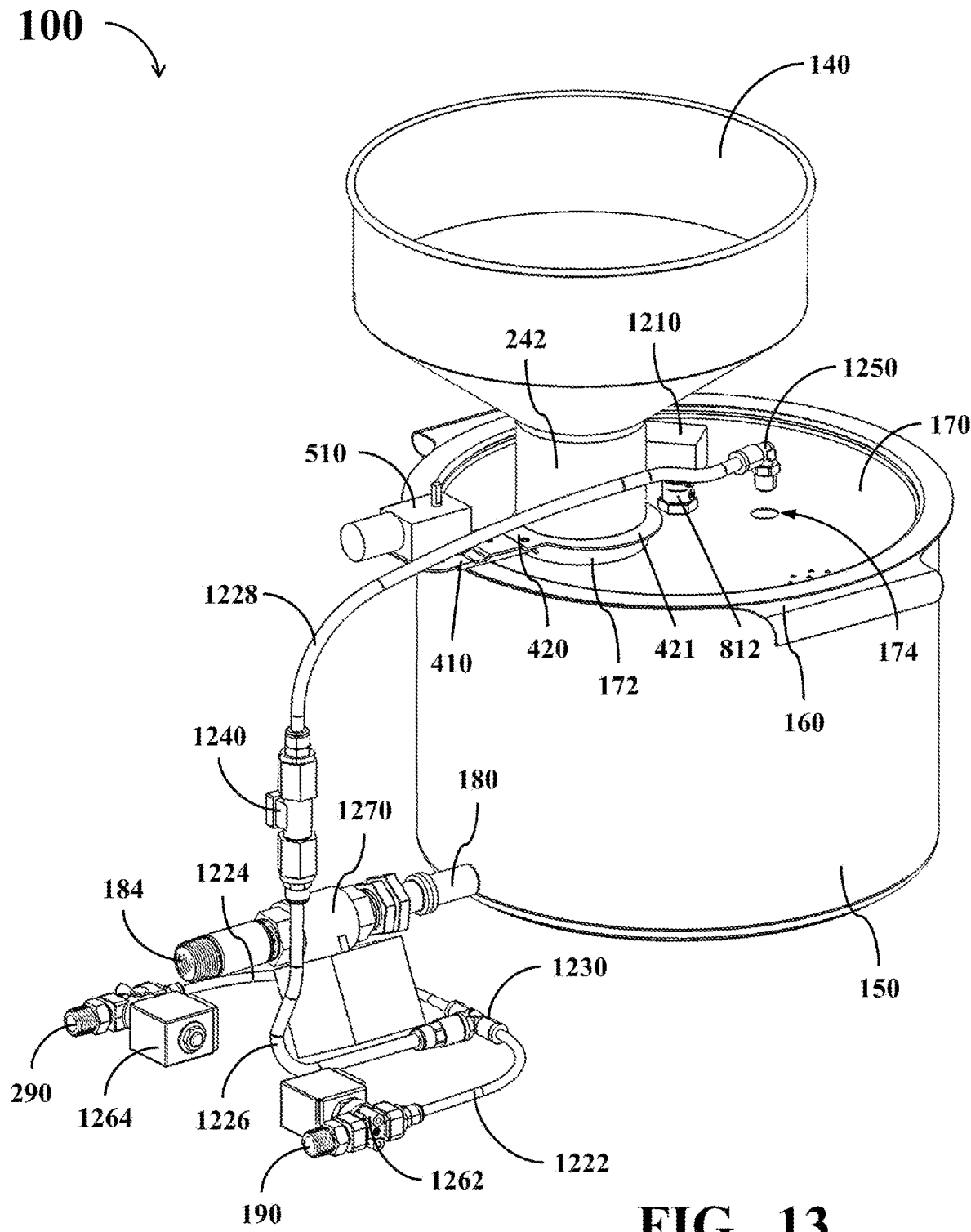

Please refer to FIG. 8 through FIG. 13. FIG. 8 shows a simplified schematic diagram of the automatic cooking machine 100 when the upper portion 110 is lifted upwards according to one embodiment of the present disclosure. FIG. 9 and FIG. 10 show simplified decomposed schematic diagrams of the cooking pot 150, the strainer 160, a driving element 810, and a blender 820 of the automatic cooking machine 100 from different viewing angles according to one embodiment of the present disclosure. FIG. 11 shows a schematic diagram of the cooking pot 150, the strainer 160, the driving element 810, and the blender 820 of FIG. 9 and FIG. 10 when they are assembled. FIG. 12 and FIG. 13 show simplified connection relationship diagrams of partial components of the automatic cooking machine 100 from different viewing angles according to one embodiment of the present disclosure.

As shown in FIG. 8, the upper portion 110 is pivoted with the supporting portion 130 through the pivot 132, and thus one end of the upper portion 110 can be lifted upwards, so that it would be convenient for the user to take out the strainer 160 or the objects in the strainer 160, or to put required ingredients into the strainer 160.

As shown in FIG. 8 through FIG. 13, the automatic cooking machine 100 further comprises the driving element 810, the blender 820, and a second motor 1210. As shown in FIG. 9 and FIG. 10, a hole 952 is further arranged near a bottom portion of a sidewall of the cooking pot 150, the strainer 160 is provided with one or more holders 962 on its upper flange, while multiple filter pores 964 are arranged on a bottom portion and sidewalls of the strainer 160. In addition, as shown in FIG. 10, a holding base 1066 is further arranged at a central position of the bottom of the strainer 160, and the holding base 1066 has a notch positioned thereon.

When the user needs to put the strainer 160 into the cooking pot 150, or needs to place the blender 820 in the strainer 160, the user may lift one end of the upper portion 110 upwards so that it would be more convenient to manipulate.

The second motor 1210 is arranged to operably drive the second rotating shaft 812 to rotate. In practice, the second motor 1210 may be arranged within the upper portion 110, and the second motor 1210 may be realized with various appropriate motors, such as an AC motor, a DC motor, a brushless DC motor, a stepper motor, a servo motor, or the like.

The driving element 810 is coupled with the second rotating shaft 812, and arranged to operably drive the blender 820 to rotate. As shown in FIG. 9 and FIG. 10, the driving element 810 comprises two bended driving arms 814, respectively arranged at two opposite sides of the driving element 810. Free ends of the aforementioned two driving arms 814 substantially bend downwards.

In this embodiment, each of the two driving arms 814 of the driving element 810 has a substantially L-shaped appearance, but this is merely an exemplary embodiment, rather than a restriction to the practical implementations. For example, each of the aforementioned two driving arms 814 may be modified to have a substantially C-shaped appearance. For another example, each of the aforementioned two driving arms 814 may be modified to have a substantially line-shaped appearance, and the two driving arms 814 may be arranged to be a slash and backslash pair.

As shown in FIG. 9 and FIG. 10, the blender 820 comprises two cantilever arms 822, multiple blending arms 824, a bended disturbing arm 921, a ring-shaped flange 923, a positioning pillar 925, and a bevel structure 927.

In the blender 820, the two cantilever arms 822 are respectively arranged at two opposite sides of a top portion of the blender 820. In this embodiment, each of the aforementioned two cantilever arms 822 has a line-shaped appearance, but this is merely an exemplary embodiment, rather than a restriction to the practical implementations. In practice, the appearance of the cantilever arm 822 may instead be modified to be any shape that can cooperate with the driving arms 814 of the driving element 810.

The multiple blending arms 824 of the blender 820 respectively extend outwards from the main body of the blender 820. As shown in FIG. 9 and FIG. 10, the aforementioned blending arms 824 of this embodiment are inclined upwards or downwards, and the blending arms 824 do not necessarily have a same length.

The disturbing arm 921 has the main body extending along a horizontal direction, and a bended portion for connecting with the main body of the blender 820.

The ring-shaped flange 923 is positioned near a bottom portion of the blender 820, and extends outwards from the blender 820. As shown in FIG. 9, a position where the aforementioned disturbing arm 921 connects with the main body of the blender 820 is higher than where the ring-shaped flange 923 is positioned.

The positioning pillar 925 is positioned beneath the ring-shaped flange 923, and extends downwards from the blender 820. The positioning pillar 925 is arranged to be inserted into the notch of the holding base 1066 positioned on the bottom of the strainer 160, so as to maintain the blender 820 to stably stand on the holding base 1066.

The bevel structure 927 is arranged between the ring-shaped flange 923 and the positioning pillar 925, and utilized to be a guiding portion for inserting the positioning pillar 925 into the holding base 1066, while reducing the probability that the positioning pillar 925 breaks during the rotation of the blender 820.

As shown in FIG. 11, when the strainer 160 is placed in the cooking pot 150, the holders 962 expose outside the cooking pot 150. In addition, when the positioning pillar 925 is inserted into the notch on the holding base 1066, the bottom surface of the ring-shaped flange 923 would touch the upper surface of the notch, the main body of the disturbing arm 921 would approach the bottom of the strainer 160 or lies flat on the bottom of the strainer 160, while free ends of the aforementioned multiple blending arms 824 would approach the sidewalls of the strainer 160 or the bottom surface of the pot lid 170.

During the period in which the heater 122 heats the cooking pot 150, the controlling circuit of the automatic cooking machine 100 may control the second motor 1210 to continuously or intermittently drive the second rotating shaft 812 to rotate the driving element 810. When the driving element 810 rotates, the two driving arms 814 would respectively touch and push the two cantilever arms 822 of the blender 820, thereby causing the blender 820 to rotate clockwise or counterclockwise. In this way, the blending arm 824 of the blender 820 would blend the ingredients in the strainer 160, while the disturbing arm 921 would stir the ingredients near the bottom area of the strainer 160.

Some ingredients are likely to stick or burnt to the bottom of pots if they are not blended during the cooking process, such as bobas, tapioca balls, tang yuan, taro balls, sweet potato balls, some kinds of noodles, or the like. Therefore, it can effectively reduce the possibility that these ingredients to stick or burnt to the bottom of the pots during the cooking process by utilizing the aforementioned driving element 810 to drive the blender 820 to rotate.

As can be appreciated from the foregoing descriptions, the blender 820 of the automatic cooking machine 100 and the driving element 810 for driving the blender 820 are separate structures, instead of being fixedly connected together. Such design would be convenient for the user to detach the blender 820 for cleansing or to replace with other blenders having different blending arm arrangements, and thus it is beneficial in improving the cleansing convenience, utilizing efficiency, and application flexibility of the automatic cooking machine 100.

As shown in FIG. 12 and FIG. 13, the automatic cooking machine 100 further comprises water pipes 1222~1228, a three-way connector 1230, a flow meter 1240, a water outlet connector 1250, an inlet valve 1262, an inlet valve 1264, and a drain valve 1270.

The inlet valve 1262 is coupled between the water inlet port 190 and the water pipe 1222. The inlet valve 1264 is coupled between the water inlet port 290 and the water pipe 1224. The three-way connector 1230 is coupled among the water pipe 1222, the water pipe 1224, and the water pipe 1226. The flow meter 1240 is coupled between the water pipe 1226 and the water pipe 1228.

The aforementioned inlet valve 1262, water pipe 1222, water pipe 1226, and water pipe 1228 collectively form a first liquid channel coupled with the water inlet port 190, and the first liquid channel may be utilized to transmit the cold water inputted from the water inlet port 190. The aforementioned inlet valve 1264, water pipe 1224, water pipe 1226, and water pipe 1228 collectively form a second liquid channel coupled with the water inlet port 290, and the second liquid channel may be utilized to transmit the hot water inputted from the water inlet port 290.

The water outlet connector 1250 is coupled with a terminal end of the water pipe 1228, and arranged to operably output cold water or hot water to the strainer 160. From another aspect, the water outlet connector 1250 is coupled with the aforementioned first liquid channel and second liquid channel at the same time. As shown in FIG. 12 and FIG. 13, when the pot lid 170 covers the cooking pot 150, the material inlet port 172 would be aligned with the opening 244 of the feeding tube 242, while the water delivery hole 174 would be aligned with an outlet of the water outlet connector 1250.

The flow meter 1240 is arranged to operably estimate the volume of water outputted from the water outlet connector 1250. The inlet valve 1262 arranged on the first liquid channel is arranged to operably control the timing for outputting cold water from the water outlet connector 1250, while the inlet valve 1264 arranged on the second liquid channel is arranged to operably control the timing for outputting hot water from the water outlet connector 1250.

The drain valve 1270 is coupled with an output terminal of the drain pipe 180, and arranged to operably control the timing of draining the liquid from the cooking pot 150.

When cooking some ingredients containing starch or colloid substances, such as bobas, tapioca balls, tang yuan, taro balls, sweet potato balls, or the like, the viscosity of the liquid in the cooking pot 150 would gradually increase because the ingredients release starch or colloid substances. If more amount of ingredients is cooked at the same time, the viscosity of the liquid in the cooking pot 150 would increase more quickly. In this situation, the osmotic pressure of the liquid in the cooking pot 150 might become close to or higher than the osmotic pressure of the ingredients, thereby increasing the difficulty for the ingredients to absorb the water in the cooking pot 150. As a result, it is likely to have the ingredients undercooked (that is, the core of the ingredients is not sufficiently cooked), which could have serious negative effect on the taste of the ingredients.

Therefore, when cooking the ingredients of the aforementioned types, the controlling circuit of the automatic cooking machine 100 is arranged to operably control the inlet valve 1262 or the inlet valve 1264 to intermittently turn on or turn off, and also control the drain valve 1270 to intermittently turn on or turn off during the period in which the heater 122 heats the cooking pot 150, so that the water outlet connector 1250 intermittently outputs cold water or hot water to the strainer 160, while the cooking pot 150 intermittently outputs a portion of the liquid through the drain pipe 180.

During the aforementioned operations, the controlling circuit of the automatic cooking machine 100 may utilize the flow meter 1240 to measure the volume of water inputted into the strainer 160 through the water outlet connector 1250, and adjust the timing to turn on and turn off the inlet valve 1262 or the inlet valve 1264 accordingly.

In other words, when cooking the ingredients of the aforementioned types, the automatic cooking machine 100 would automatically replace a portion of the liquid in the cooking pot 150 while cooking the ingredients so as to significantly reduce the viscosity of the liquid in the cooking pot 150, thereby effectively mitigating the problem that it is difficult to have the ingredients of these types sufficiently cooked.

Therefore, the aforementioned automatic water replacing mechanism can effectively increase the amount of ingredients to be cooked at the same time without changing the volume of the cooking pot 150 and the strainer 160. For restaurants or beverage stores that need to consume a lot of the ingredients of the aforementioned types, the aforementioned automatic water replacing mechanism of the automatic cooking machine 100 not only effectively increases the efficiency to cook the ingredients of the aforementioned types but also reduces the power consumption or gas consumption.

From another aspect, by adopting the aforementioned automatic water replacing mechanism, the automatic cooking machine 100 is enabled to cook the same amount or even more ingredients with a smaller machine volume, which is beneficial to reduce the space required to place the automatic cooking machine 100.

After the automatic cooking machine 100 completes cooking the ingredients of various types, the user may lift the upper portion 110 upwards for an appropriate angle, so as to take out the blender 820 from the strainer 160. In this embodiment, the upper portion 110 may be lifted upwards for up to about 80 degrees, which is convenient for the user to take out the blender 820 from the strainer 160. Then, the user may slowly lift the strainer 160 upwards to detach the strainer 160 from the cooking pot 150, and most of the water would be drained through the filter pores 964. The user may pour the cooked ingredients within the strainer 160 into appropriate containers for later usage or may add other seasonings into the cooked ingredients.

As can be appreciated from the aforementioned descriptions, it can increase the efficiency in cooking some ingredients by utilizing the automatic cooking machine 100 to automatically cook relevant ingredients, thereby reducing the burden of the staffs of the restaurants or beverage stores for preparing relevant ingredients.

Since the automatic cooking machine 100 can control the temperature and the time to cook the ingredients, it prevents food waste problems caused by over-cooking. The aforementioned mechanism that the automatic cooking machine 100 controls the blocking element 420 may be utilized to achieve the timer function for scheduling the time to cook.

By utilizing the driving element 810 to drive the blender 820 to rotate, it can effectively reduce the likelihood for having some ingredients stuck or burnt to the pots during the cooking process, especially for bubbles, tapioca balls, tang yuan, taro balls, sweet potato balls, or the like.

In addition, since the aforementioned blender 820 and the driving element 810 are separated structures, instead of being fixedly connected together, it is very convenient for the user to detach the blender 820 for cleansing, or to replace with other blenders having different blending arm arrangements. Such design of separate structures is beneficial in improving the cleansing convenience, utilizing efficiency, and application flexibility of the automatic cooking machine 100.

Please note that the structure of the aforementioned the automatic cooking machine 100 is merely an exemplary embodiment, rather than a restriction to the practical implementations. For example, in some embodiments, the aforementioned water inlet port 190 and the relevant inlet valve 1262 and the water pipe 1222 of the automatic cooking machine 100 may be omitted. In other embodiments, the aforementioned water inlet port 290 and the relevant inlet valve 1264 and the water pipe 1224 of the automatic cooking machine 100 may be omitted.

The quantity of the first magnetic element 413 of the aforementioned moving arm 410 as well as the quantity of the second magnetic element 427 of the blocking element 420 may be modified according to actual requirements.

In some embodiments where the blending function is not required, the aforementioned blender 820 and relevant driving mechanisms and positioning mechanisms may be omitted.

In some embodiments where the draining function is not required, the aforementioned hole 952, the drain pipe 180, and the relevant drain valve 1270 may be omitted.

In addition, in some embodiments where the automatic cooking machine 100 does not need to control the amount of ingredients to be cooked and the timing of cooking, the aforementioned connection port 314, the hopper 140, the moving arm 410, the blocking element 420, and relevant driving mechanisms may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly connected to the second device or indirectly connected to the second device with other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," and the like, may be used herein to describe the function of a particular element or to describe the relationship of one element to another element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An automatic cooking machine (100), comprising:
   an upper portion (110), having a connection port (314) thereon;
   a control interface (112), arranged to operably generate controlling commands according to manipulations of a user to control operations of the automatic cooking machine (100);
   a base (120);
   a heater (122), arranged on the base (120);
   a supporting portion (130), coupled between the upper portion (110) and the base (120), and arranged to support the upper portion (110);
   a hopper (140), arranged to operably receive ingredients, and having a hollow feeding tube (242), wherein the feeding tube (242) is detachably inserted into the connection port (314), and a terminal end of the feeding tube (242) has an opening (244);
   a cooking pot (150), arranged to be capable of being heated on the heater (122); and
   a strainer (160), arranged to be capable of being placed in the cooking pot (150) to receive ingredients, wherein the strainer (160) is provided with one or more holders (962), a bottom and sidewalls of the strainer (160) are provided with multiple filter pores (964), and when the strainer (160) is placed in the cooking pot (150), the one or more holders (962) are exposed outside the cooking pot (150);
   wherein a holding base (1066) is further arranged at a center position of the bottom of the strainer (160), and the holding base (1066) has a notch positioned thereon, while the automatic cooking machine (100) further comprises:
   a second motor (1210), arranged to operably drive a second rotating shaft (812) to rotate;
   a driving element (810), coupled with the second rotating shaft (812), wherein the driving element (810) comprises:
      two bended driving arms (814), respectively arranged at two opposite sides of the driving element (810), wherein free ends of the two driving arms (814) substantially extend downwards; and
   a blender (820), comprising:
      two cantilever arms (822), respectively arranged at two opposite sides of a top portion of the blender (820);

multiple blending arms (824), respectively extending outwards from a main body of the blender (820);

a ring-shaped flange (923), positioned near a bottom portion of the blender (820) and extending outwards from the blender (820); and a positioning pillar (925), positioned beneath the ring-shaped flange (923), and arranged to be operably inserted into the notch on the holding base (1066);

wherein when the second motor (1210) drives the second rotating shaft (812) to rotate the driving element (810), the two driving arms (814) respectively touch and push the two cantilever arms (822) of the blender (820) to drive the blender (820) to rotate clockwise or counterclockwise.

2. The automatic cooking machine (100) of claim 1, further comprising:

a first motor (510), arranged to operably drive a first rotating shaft (411) to rotate;

a moving arm (410), coupled with the first rotating shaft (411), wherein the moving arm (410) comprises:
- a first magnetic element (413), arranged on one of surfaces of the moving arm (410);
- a first limiting element (415), extending outwards from one of the surfaces of the moving arm (410); and
- a free end (417); and a blocking element (420), comprising:
- a blocking plate (421), arranged to operably block the opening (244) of the feeding tube (242);
- a tail portion (423);
- a connecting portion (425), positioned between the blocking plate (421) and the tail portion (423);
- a second magnetic element (427), arranged on one of surfaces of the connecting portion (425); and
- a second limiting element (429), extending outwards from one of the surfaces of the connecting portion (425) or extending outwards from one of surfaces of the blocking plate (421);

wherein when the blocking element (420) approaches the moving arm (410), the first magnetic element (413) and the second magnetic element (427) are attracted to each other, causing the blocking element (420) to detachably attach on the moving arm (410).

3. The automatic cooking machine (100) of claim 2, wherein the moving arm (410) further comprises a first notch (519) positioned on the free end (417), while the blocking element (420) further comprises a second notch (629) positioned on the tail portion (423);

wherein the first limiting element (415) is utilized to block the second notch (629), while the second limiting element (429) is utilized to block the first notch (519).

4. The automatic cooking machine (100) of claim 2, wherein the first magnetic element (413) is arranged on a bottom surface of the moving arm (410), and the first limiting element (415) is arranged on an upper surface of the moving arm (410).

5. The automatic cooking machine (100) of claim 4, wherein the second magnetic element (427) and the second limiting element (429) are both arranged on a bottom surface of the blocking element (420).

6. The automatic cooking machine (100) of claim 4, wherein the second magnetic element (427) is arranged on an upper surface of the blocking element (420), while the second limiting element (429) is arranged on a bottom surface of the blocking element (420).

7. The automatic cooking machine (100) of claim 4, wherein the free end (417) of the moving arm (410) bends downwards, so that an included angle (710) between 120-165 degrees is formed between the free end (417) and a main body of the moving arm (410).

8. The automatic cooking machine (100) of claim 2, wherein the connection port (314) penetrates the upper portion (110).

9. The automatic cooking machine (100) of claim 2, further comprising:

a pivot (132), arranged on the supporting portion (130) and connected with the upper portion (110);

wherein the upper portion (110) is pivoted with the supporting portion (130) through the pivot (132), so that an end of the upper portion (110) is enabled to be lifted upwards.

10. The automatic cooking machine (100) of claim 2, further comprising:

a water inlet port (190, 290), arranged to operably input cold water or hot water;

a liquid channel (1222, 1262, 1226, 1228; 1224, 1264, 1226, 1228), coupled with the water inlet port (190, 290), and arranged to operably transmit the cold water or the hot water inputted from the water inlet port (190, 290); and a water outlet connector (1250), coupled with the liquid channel (1222, 1262, 1226, 1228; 1224, 1264, 1226, 1228), and arranged to operably output cold water or hot water into the strainer (160).

11. The automatic cooking machine (100) of claim 10, further comprising:

a pot lid (170), comprising a material inlet port (172) and a water delivery hole (174);

wherein when the pot lid (170) covers the cooking pot (150), the material inlet port (172) is aligned with the opening (244) of the feeding tube (242), and the water delivery hole (174) is aligned with the water outlet connector (1250).

12. The automatic cooking machine (100) of claim 10, further comprising:

an inlet valve (1262, 1264), arranged on the liquid channel (1222, 1262, 1226, 1228; 1224, 1264, 1226, 1228), and arranged to operably control timing of outputting cold water or hot water from the water outlet connector (1250).

13. The automatic cooking machine (100) of claim 12, wherein a hole (952) is arranged near a bottom portion of a sidewall of the cooking pot (150), and the automatic cooking machine (100) further comprises:

a drain pipe (180), coupled with the hole (952), and arranged to operably drain liquid from the cooking pot (150);

a drain valve (1270), coupled with an output terminal of the drain pipe (180), and arranged to operably control timing of draining the liquid from the cooking pot (150); and a drain port (184), coupled with the drain valve (1270), and arranged to operably output liquid passed through the drain valve (1270);

wherein during a period in which the heater (122) heats the cooking pot (150), the inlet valve (1262, 1264) intermittently turns on and turns off, so that the water outlet connector (1250) outputs cold water or hot water into the strainer (160), while the drain valve (1270) intermittently turns on and turns off to output a portion of the liquid within the cooking pot (150).

14. The automatic cooking machine (100) of claim 2, wherein a hole (952) is arranged near a bottom portion of a sidewall of the cooking pot (150), and the automatic cooking machine (100) further comprises:

a drain pipe (180), coupled with the hole (952), arranged to operably drain liquid from the cooking pot (150);

a drain valve (1270), coupled with an output terminal of the drain pipe (180), and arranged to operably control timing of draining the liquid from the cooking pot (150); and a drain port (184), coupled with the drain valve (1270), and arranged to operably output liquid passed through the drain valve (1270).

15. The automatic cooking machine (100) of claim 1, wherein the blender (820) further comprises:

a bended disturbing arm (921); and a bevel structure (927), arranged between the ring-shaped flange (923) and the positioning pillar (925);

wherein when the positioning pillar (925) is inserted into the notch on the holding base (1066), a main body of the disturbing arm (921) approaches the bottom of the strainer (160) or lies flat on the bottom of the strainer (160).

* * * * *